United States Patent
Kim et al.

(10) Patent No.: US 11,195,304 B2
(45) Date of Patent: Dec. 7, 2021

(54) IMAGE PROCESSING APPARATUS AND METHOD

(71) Applicant: Samsung Electronics Co., Ltd., Suwon-si (KR)

(72) Inventors: Sung-Oh Kim, Suwon-si (KR);
Seung-Won Oh, Seoul (KR);
Jae-Moon Kim, Uiwang-si (KR);
Hyun-Hee Park, Seoul (KR);
Yong-Man Lee, Seongnam-si (KR);
Seul-Ki Jang, Suwon-si (KR);
Hyung-Ju Chun, Hwaseong-si (KR);
Jong-Bum Choi, Yongin-si (KR);
Kwang-Tai Kim, Suwon-si (KR);
Soo-Hyung Kim, Hwaseong-si (KR);
Dong-Hyun Yeom, Bucheon-si (KR);
Ki-Huk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 714 days.

(21) Appl. No.: 16/073,682

(22) PCT Filed: Feb. 1, 2017

(86) PCT No.: PCT/KR2017/001079
§ 371 (c)(1),
(2) Date: Jul. 27, 2018

(87) PCT Pub. No.: WO2017/135675
PCT Pub. Date: Aug. 10, 2017

(65) Prior Publication Data
US 2021/0209801 A1  Jul. 8, 2021

(30) Foreign Application Priority Data

Feb. 4, 2016 (KR) .......................... 10-2016-0013861

(51) Int. Cl.
*G06T 7/90* (2017.01)
*H04N 5/232* (2006.01)
(Continued)

(52) U.S. Cl.
CPC ................ *G06T 7/90* (2017.01); *G06T 7/246* (2017.01); *G06T 7/55* (2017.01); *H04N 5/23293* (2013.01)

(58) Field of Classification Search
CPC .............. G06T 7/90; G06T 7/246; G06T 7/55
See application file for complete search history.

(56) References Cited

U.S. PATENT DOCUMENTS 8,761,507 B1 * 6/2014 Steger .................... G06T 5/002
382/167
2009/0285476 A1  11/2009 Choe et al.
(Continued)

FOREIGN PATENT DOCUMENTS

JP          5395956 B2   10/2013
KR   10-2009-0120159 A   11/2009

*Primary Examiner* — Qian Yang
(74) *Attorney, Agent, or Firm* — Jefferson IP Law, LLP

(57) ABSTRACT

Various embodiments of the present disclosure propose an apparatus and a method for processing an image for converting a frame rate. To this end, the present invention is capable of providing an apparatus and a method for processing an image, configured to convert a frame rate on the basis of monochrome image frames acquired through a monochrome sensor, and perform an image synthesis with the frame rate converted monochrome image frame by using a downsampled color image frame acquired through a color sensor.

16 Claims, 11 Drawing Sheets

(51) Int. Cl.
　　　*G06T 7/55* (2017.01)
　　　*G06T 7/246* (2017.01)

(56) References Cited

U.S. PATENT DOCUMENTS

| | | |
|---|---|---|
| 2010/0026839 A1 | 2/2010 | Border et al. |
| 2013/0100255 A1 | 4/2013 | Ohba et al. |
| 2013/0335599 A1 | 12/2013 | Zhang |
| 2015/0172529 A1 | 6/2015 | Aota |
| 2015/0172539 A1* | 6/2015 | Neglur ............... H04N 5/23219 348/207.1 |
| 2015/0319326 A1 | 11/2015 | Pfeiffer et al. |
| 2016/0353054 A1* | 12/2016 | Gilmutdinov ........ H04N 7/0127 |
| 2017/0186223 A1* | 6/2017 | Lerner .................. G06T 7/0002 |

\* cited by examiner

<S6 Image>      <Result Image>

IMAGE PROCESSING APPARATUS AND METHOD

CROSS REFERENCE TO RELATED APPLICATION(S)

This application is a National Phase Entry of PCT International Application No. PCT/KR2017/001079, which was filed on Feb. 1, 2017, and claims priority to Korean Patent Application No. 10-2016-0013861, which was filed on Feb. 4, 2016, the contents of which are incorporated herein by reference.

TECHNICAL FIELD

The present disclosure relates generally to an image processing apparatus and method for converting images acquired through a plurality of image sensors.

BACKGROUND

Recently, as a broadcasting service, an image communication service converged with a communication service has been generalized. The image communication service is based on not only a terminal which can rapidly process information but also a broadband network that provides a high-speed information delivery.

The terminal supporting the image communication service consumes much power due to image processing. Particularly, a resolution of the image to be processed may be a main factor that determines power consumption of the terminal when display is performed. For example, power consumption when a terminal, which may be portable (hereinafter, referred to as a "portable terminal"), performs display may increase in proportion to the resolution of the image to be processed.

The increase in the image resolution increases a bandwidth of a link through which information on the image to be processed is transmitted. For example, a bandwidth required by an Application Processor (AP) within one device to transmit a frame to a display device increases in proportion to the display resolution. In another example, when one device transfers multimedia data to another device on a wireless network, a bandwidth to be used in the wireless network may increase in proportion to the size of multimedia data to be transferred.

With the development of an output device (for example, a display) and user's demand for an image having an improved picture quality, the image resolution displayed through the output device may increase and the image size may increase. Accordingly, various image processing methods by which the electronic device improves a picture quality of a large and complex image have been developed. As one of the image processing technologies to improve the picture quality, there is High Dynamic Range (HDR) technology. The HDR technology is technology for successively taking photos having different luminances and then composing at least two photos into one photo.

For processing a high-resolution or a large-capacity image, the electronic device may use a large amount of resources. For example, in order to perform a larger amount of data calculations related to conversion or correction of a high-resolution image, the electronic device may use a relatively large amount of memories or processing resources. Further, in order to transmit a large-capacity image to another electronic device, the electronic device may use a relatively large amount of networking resources to increase an amount of data to be transmitted or a transmission rate.

SUMMARY

An electronic device may convert an image to have a specific image format in order to process a high-resolution image and transmit a large-capacity image. For example, the electronic device may process an image by converting a red component, a green component, and a blue component of the image based on a RGB (Red, Green, Blue) color model into a YCbCr image format including a luminance component, a blue difference chrome component, and a red difference chrome component of the image. For example, the electronic device may control (for example, increase) luminance of the image by controlling (for example, increasing) the luminance component included in the YCbCr image format of the image.

An image quality in the electronic device may be proportional to the performance of a lens or an image sensor included therein. However, using a high-performance lens or image sensor for the electronic device in order to acquire a high-picture quality image may act as a factor to increase production costs of the electronic device.

Accordingly, it is required to create a method of acquiring a high-resolution image on the basis of a photographing condition change and efficient image processing while maintaining the performance of hardware such as the lens or the image sensor included in the electronic device.

Various embodiments of the present disclosure may provide an apparatus and a method for processing images which convert a frame rate through two sensors having different characteristics.

Various embodiments of the present disclosure may provide an apparatus and a method for processing images which generate a new image by composing images having different characteristics through two sensors having different characteristics.

Various embodiments of the present disclosure may provide an apparatus and a method for processing images which generate a new image on the basis of a plurality of images acquired through at least two sensors having different photographing conditions.

Various embodiments of the present disclosure may provide an apparatus and a method for processing images which convert a frame rate on the basis of black and white image frames acquired through a black and white sensor and perform image matching between color image frames acquired through a color sensor and the black and white image frames of which the frame rate is converted.

In accordance with an aspect of the present disclosure, an electronic device is provided. The electronic device includes: a memory, a first black and white (BW) image sensor; a second image sensor; and a processor, wherein the processor is configured to acquire a first black and white image corresponding to a first time for a subject and a second black and white image corresponding to a second time for the subject through the first BW image sensor, acquire a color image for the subject through the second image sensor, generate a first color image generated by composing the first black and white image and a first color determined based on at least some of color information of the color image, and generate a second color image generated by composing the second black and white image and a second color determined based on at least some of the color information, and store the first color image and the second color image in the memory as video data.

In accordance with another aspect of the present disclosure, a method of operating an electronic device including a first black and white (BW) image sensor and a second image sensor is provided. The method includes: acquiring a first black and white image corresponding to a first time for a subject and a second black and white image corresponding to a second time for the subject through the first BW image sensor; acquiring a color image for the subject through the second image sensor; generating a first color image generated by composing the first black and white image and a first color determined based on at least some of color information of the color image, and generating a second color image generated by composing the second black and white image and a second color determined based on at least some of the color information; and storing the first color image and the second color image in a memory as video data.

In accordance with another aspect of the present disclosure, a computer-readable recording medium of an electronic device a first black and white (BW) image sensor and a second image sensor is provided. The computer-readable recording medium may record a program to execute operations including acquiring a first black and white image corresponding to a first time for a subject and a second black and white image corresponding to a second time for the subject through the first BW image sensor; acquiring a color image for the subject corresponding to a third time between the first time and the second time through the second image sensor; generating a first color image generated by composing the first black and white image and a first color determined based on at least some of color information of the color image, and generating a second color image generated by composing the second black and white image and a second color determined based on at least some of the color information; and storing the first color image and the second color image in a memory as video data.

Advantageous Effects

An apparatus and a method for processing an image according to various embodiments of the present disclosure may solve the problem of a light receiving amount and a calculation amount that hinder an image having a high frame rate from being acquired.

DETAILED DESCRIPTION OF THE DISCLOSURE

Figure 1:
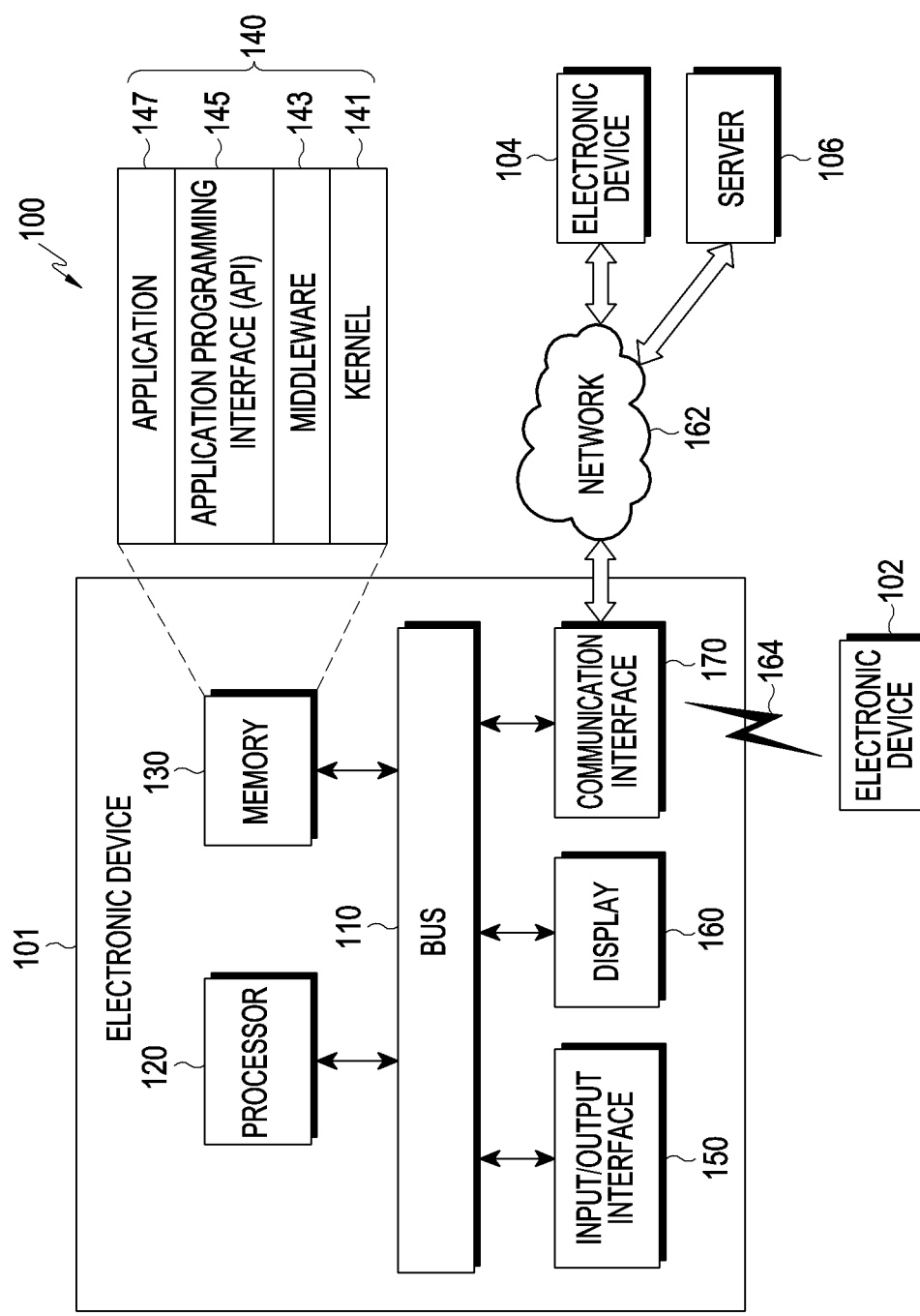
FIG. 1 illustrates a network environment including a wireless terminal according to various proposed embodiments.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" may include (1) at least one A, (2) at least one B, or (3) both at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

As used herein, the expression "configured to" may be interchangeably used with the expression "suitable for", "having the capability to", "designed to", "adapted to", "made to", or "capable of". The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

The terms used in the present disclosure are only used to describe specific embodiments, and are not intended to limit the present disclosure. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Various embodiments of the present disclosure may provide the following three schemes to acquire a color image having a high frame rate. That is, it is possible to generate a color image of a high frame rate (high resolution) by spreading (color diffusing) a color to a black and white image of a high frame rate (high resolution) by using color information which can be acquired from a color image of a relatively low frame rate (low resolution).

A first scheme uses a large amount of received light of a black and white (BW) image sensor. The corresponding scheme may acquire a plurality of black and white images through a combination of a black and white sensor and a color image sensor and compose the plurality of acquired black and white images and the color image, so as to acquire a color image having a high frame rate (a high resolution color image or a color slow video). In this case, there is no limit on the resolution of the black and white image sensor and the color image sensor.

A second scheme uses a Frame Rate Conversion (FRC) calculation. The corresponding scheme may search for a motion vector in a low resolution color image and perform a local dense matching and FRC calculation in a (relatively) high resolution black and white image on the basis of the value. At this time, the resolution of the color image sensor may be lower than the resolution of the black and white image sensor. Otherwise, the motion vector search may be performed after down-sampling the color image acquired from the color image sensor regardless of the resolution and then converting the color image to have the low resolution.

A third scheme uses an Edged Block Scaling (EBS) image format. The corresponding scheme performs the FRC calculation using color information (S) and edge information (E) since the EBS image format is an image format including color information (S), edge information (E), and image-related additional information (B).

Hereinafter, an electronic device according to various embodiments will be described with reference to the accompanying drawings. In the present disclosure, the term "user" may indicate a person using an electronic device or a device (for example, an artificial intelligence electronic device) using an electronic device.

FIG. 1 illustrates an electronic device 101 within a network environment 100 according to various embodiments. The electronic device 101 may include a bus 110, a processor 120, a memory 130, an input/output interface 150, a display 160, a communication interface 170, and an image processing module 140. In some embodiments, the electronic device 101 may omit at least one of the elements, or may further include other elements.

The bus 110 may include, for example, a circuit that interconnects the components 120 to 170 and delivers communication (for example, a control message and/or data) between the elements 120 to 170.

The processor 120 may include one or more of a Central Processing Unit (CPU), an Application Processor (AP), and a Communication Processor (CP). The processor 120, for example, may carry out operations or data processing relating to the control and/or communication of at least one other element of the electronic device 101.

The memory 130 may include volatile and/or non-volatile memory. The memory 130 may store, for example, instructions or data relevant to at least one other element of the electronic device 101. According to an embodiment, the memory 130 may store software and/or a program 180. For example, the program 180 may include a kernel 181, a middleware 183, an Application Programming Interface (API) 185, and/or applications (or apps) 187. At least some of the kernel 181, the middleware 183, and the API 185 may be referred to as an Operating System (OS).

The kernel 181 may control or manage, for example, system resources (for example, the bus 110, the processor 120, and the memory 130) which are used to execute an operation or a function implemented in the other programs (for example, the middleware 183, the API 185, and the application programs 187). Furthermore, the kernel 181 may provide an interface through which the middleware 183, the API 185, or the application programs 187 may access the individual elements of the electronic device 101 to control or manage the system resources.

The middleware 183 may function as, for example, an intermediary for allowing the API 185 or the application programs 187 to communicate with the kernel 181 to exchange data.

Furthermore, the middleware 183 may process one or more task requests, which are received from the application programs 187, according to priorities thereof. For example, the middleware 183 may assign priorities for using the system resources (for example, the bus 110, the processor 120, the memory 130, and the like) of the electronic device 101 to one or more of the application programs 187. For example, the middleware 183 may perform scheduling or load balancing for one or more task requests by processing the one or more task requests according to priorities assigned to at least one application.

The API 185, which is an interface through which the applications 187 control functions provided from the kernel 181 or the middleware 183, may include, for example, at least one interface or function (for example, instruction) for file control, window control, image processing, text control, or the like.

The input/output interface 150 may function as, for example, an interface that can forward instructions or data, which are input from a user or an external device, to the other element(s) of the electronic device 101. Furthermore, the input/output interface 150 may output the instructions or data received from the other component element(s) of the electronic device 101 to the user or another external device. For example, the input/output interface 150 may include a plurality of image sensors having different characteristics. The input/output interface 150 may transfer images photographed by a plurality of image sensors to the image processing module 140, the memory 130, the display 160, and the communication interface 170 through the bus 110. The photographed images may have different image characteristics. This may be due to a difference in the image sensor characteristic or a condition set for the photographing.

The display 160 may include, for example, a Liquid Crystal Display (LCD), a Light-Emitting Diode (LED) display, an Organic Light-Emitting Diode (OLED) display, a MicroElectroMechanical Systems (MEMS) display, and an electronic paper display. The display 160 may display various types of contents (for example, text, images, videos, icons, or symbols). The display 160 may include a touch screen and may receive, for example, a touch, gesture, proximity, or hovering input using an electronic pen or the user's body part.

The communication interface 170 may establish, for example, communication between the electronic device 101 and an external device (for example, a first external electronic device 102, a second external electronic device 104, or a server 106). For example, the communication interface 170 may be connected to a network 162 through wireless or wired communication to communicate with the external device (for example, the second external electronic device 104 or the server 106).

The wireless communication may use, for example, at least one of Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), Global System for Mobile Communications (GSM) and the like, for example, as a cellular communication protocol. In addition, the wireless communication may include, for example, short-range communication 164. The short-range communication 164 may include at least one of, for example, Wi-Fi, Bluetooth, Near Field Communication (NFC), Magnetic Stripe Transmission (MST), and Zigbee. The wireless communication may use, for example, a Global Positioning System (GPS) or a Global Navigation Satellite System (GNSS). The wired communication may include, for example, at least one of a Universal Serial Bus (USB), a High Definition Multimedia Interface (HDMI), Recommended Standard-232 (RS-232), and a Plain Old Telephone Service (POTS). The network 162 may include at least one of communication networks such as a computer network (for example, a LAN or a WAN), the Internet, and a telephone network.

The image processing module 140 may acquire, for example, additional information (for example, binary data of edge information or scale information, high frequency component information, color information, luminance information, pattern information, motion information, or a black level value) generated on the basis of some of the edge information (for example, high frequency component information) or some of the scale information (for example, a down-scaled image) related to an input image, and generate an output image corresponding to at least some of the input image on the basis of the acquired additional information. For example, the image processing module 140 may upscale the down-scaled input image included in the scale information and generate an output image on the basis of the up-scaled input image and the edge information.

The image processing module 140 may generate a new image on the basis of a plurality of images provided from a plurality of image sensors having different characteristics including the input/output interface 150. That is, the image processing module 140 may extract information on the characteristic from an image reflecting the characteristics of a plurality of image sensors and process images having different characteristics on the basis of the extracted information, so as to generate an image having a new characteristic.

Although FIG. 1 illustrates the image processing module 140 as an element independent from the processor 120 and the memory 130, various embodiments are not limited thereto. For example, the image processing module 140 may be implemented by being integrated with the processor 120, or may be stored in the memory 130 in a software form, and thus, may be implemented in a form that may be executed in the processor 120. Further, the image processing module 140 may be implemented, for example, while being distributed to the processor 120 and the memory 130.

Each of the first and second external electronic devices 102 and 104 may be of the same or a different type from the electronic device 101. According to an embodiment, the server 106 may include a group of one or more servers. According to various embodiments, all or some of the operations performed in the electronic device 101 may be performed in another electronic device or a plurality of electronic devices (for example, the electronic devices 102 and 104 or the server 106). According to an embodiment, when the electronic device 101 has to perform a function or service automatically or in response to a request, the electronic device 101 may request another device (for example, the electronic device 102 or 104, or the server 106) to perform at least some functions relating thereto, instead of autonomously or additionally performing the function or service. Another electronic device (for example, the electronic device 102 or 104, or the server 106) may execute the requested functions or the additional functions, and may deliver a result of the execution to the electronic apparatus 101. The electronic device 101 may provide the received result as it is, or may additionally process the received result to provide the requested functions or services. To this end, for example, cloud computing, distributed computing, or client-server computing technology may be used.

Figure 2:
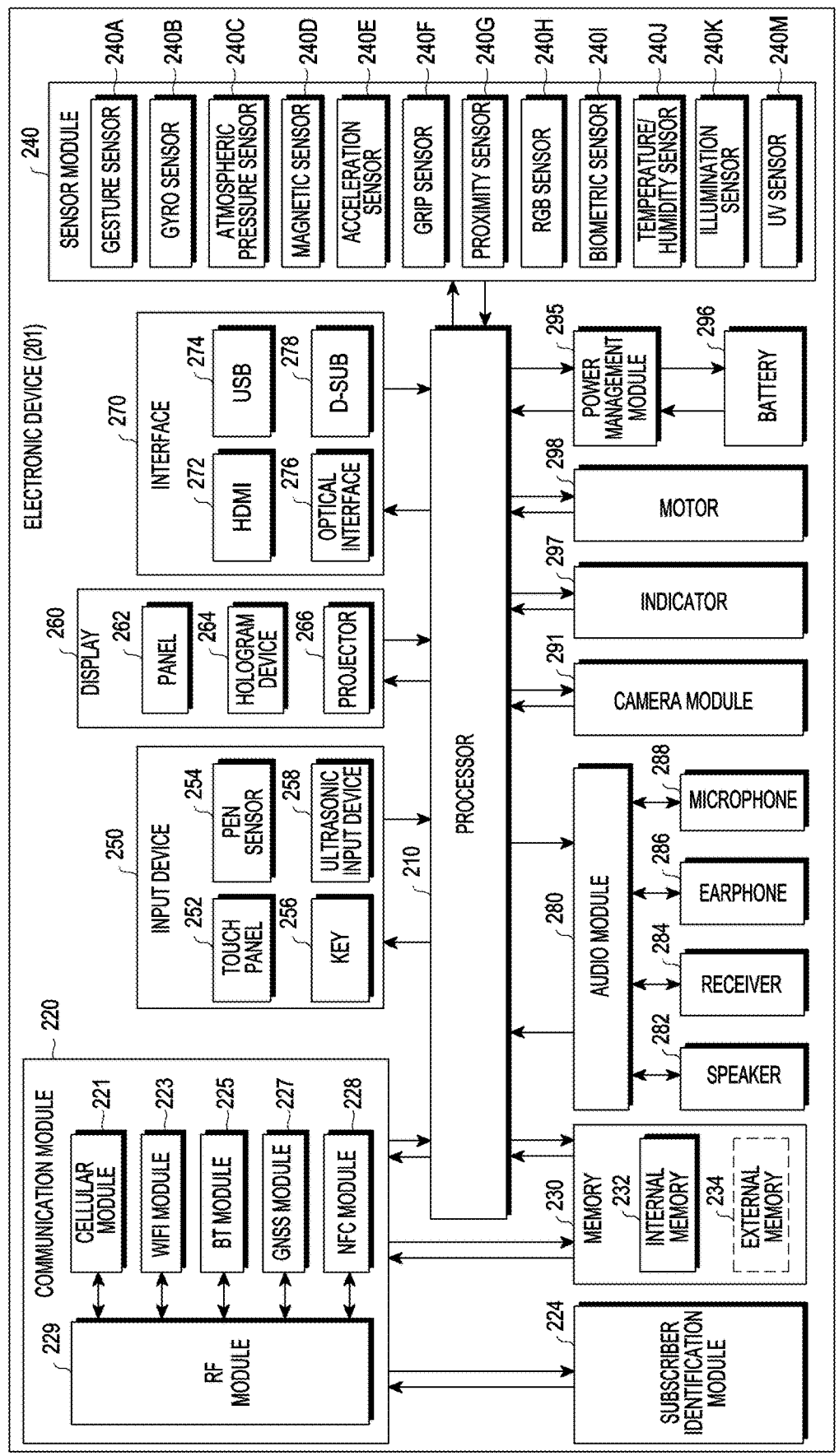
FIG. 2 is a block diagram illustrating a wireless terminal according to various proposed embodiments.

FIG. 2 is a block diagram illustrating an electronic device 201 according to various embodiments.

Referring to FIG. 2, the electronic device 201 may include, for example, the entirety or a part of the electronic device 101 illustrated in FIG. 1. The electronic device 201 may include at least one Application Processor (AP) 210, a communication module 220, a Subscriber Identification Module (SIM) card 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software elements connected thereto and may perform various data processing and operations by driving an operating system or an application program. The processor 210 may be implemented by, for example, a System on Chip (SoC). According to an embodiment, the processor 210 may further include a Graphic Processing Unit (GPU) and/or an image signal processor. The processor 210 may also include at least some of the elements illustrated in FIG. 2 (for example, a cellular module 221). The processor 210 may load, in a volatile memory, instructions or data received from at least one of the other elements (for example, a non-volatile memory), process the loaded instructions or data, and store the result data in the non-volatile memory.

The communication module 220 may have a configuration equal or similar to that of the communication interface 170 of FIG. 1. The communication module 220 may include, for example, a cellular module 221, a Wi-Fi module 223, a Bluetooth module 225, a GNSS module 227, an NFC module 228, and a Radio Frequency (RF) module 229.

The cellular module 221 may provide, for example, a voice call, a video call, a text message service, an Internet service, or the like through a communication network. According to an embodiment of the present disclosure, the cellular module 221 may identify or authenticate an electronic device 201 in the communication network using a subscriber identification module (for example, a Subscriber Identity Module (SIM) card) 224. According to an embodiment, the cellular module 221 may perform at least some of the functions that the AP 210 may provide. According to an embodiment, the cellular module 221 may include a CP.

For example, each of the Wi-Fi module 223, the BT module 225, the GPS module 227, and the NFC module 228 may include a processor for processing data transmitted/received through the corresponding module. In some embodiments, at least some (two or more) of the cellular module 221, the Wi-Fi module 223, the Bluetooth module 225, the GNSS module 227, and the NFC module 228 may be included in a single Integrated Chip (IC) or IC package.

The RF module 229 may transmit/receive, for example, a communication signal (for example, an RF signal). The RF module 229 may include, for example, a transceiver, a Power Amplifier Module (PAM), a frequency filter, a Low Noise Amplifier (LNA), an antenna, and the like. According to another embodiment, at least one of the cellular module 221, the Wi-Fi module 223, the BT module 225, the GNSS module 227, and the NFC module 228 may transmit/receive an RF signal through a separate RF module.

The subscriber identification module 224 may include, for example, a card including a subscriber identity module and/or an embedded SIM, and may contain unique identification information (for example, an Integrated Circuit Card Identifier (ICCID)) or subscriber information (for example, an International Mobile Subscriber Identity (IMSI)).

The memory 230 (for example, the memory 130) may include, for example, an internal memory 232 or an external memory 234. The internal memory 232 may include, for example, at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard disc drive, a Solid State Drive (SSD), and the like).

The external memory 234 may further include a flash drive, for example, a Compact Flash (CF), a Secure Digital (SD), a Micro-Secure Digital (Micro-SD), a Mini-Secure Digital (Mini-SD), an extreme Digital (xD), a Multi-Media Card (MMC), a memory stick, or the like. The external memory 234 may be functionally and/or physically connected to the electronic device 201 through various interfaces.

The sensor module 240 may, for example, measure a physical quantity or detect the operating state of the electronic device 201 and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, an illumination sensor 240K, and a ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments, the electronic device 201 may further include a processor, which is configured to control the sensor module 240, as a part of the processor 210 or separately from the processor 210 in order to control the sensor module 240 while the processor 210 is in a sleep state.

The input device 250 may include, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. Furthermore, the touch panel 252 may further include a control circuit. The touch panel 252 may further include a tactile layer to provide a tactile reaction to a user.

The (digital) pen sensor 254 may include, for example, a recognition sheet that is a part of, or separate from, the touch panel. The key 256 may include, for example, a physical button, an optical key, or a keypad. The ultrasonic input device 258 may detect ultrasonic waves, which are generated by an input tool, through a microphone (for example, a microphone 288) and may identify data corresponding to the detected ultrasonic waves.

The display 260 may include a panel 262, a hologram device 264, or a projector 266.

The panel 262 may have a configuration that is the same as, or similar to, that of the display 160 illustrated in FIG. 1. The panel 262 may be implemented to be, for example, flexible, transparent, or wearable. The panel 262, together with the touch panel 252, may be implemented as one module.

According to an embodiment, the panel 262 may include at least one sensor. For example, the panel 262 may include a pressure sensor (or a force sensor (interchangeably used hereinafter)). The pressure sensor may be a sensor which can measure a strength of pressure of a user's touch. The pressure sensor and the touch panel 252 may be implemented in an integrated type or separately implemented as one or more sensors.

The hologram device 264 may show a three dimensional image in the air by using light interference. The projector 266 may display an image by projecting light onto a screen. The screen may be located, for example, in the interior of, or on the exterior of, the electronic device 201. According to an embodiment, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-subminiature (D-sub) 278. The interface 270 may be included in, for example, the communication circuit 170 illustrated in FIG. 1. Additionally or alternatively, the interface 270 may, for example, include a mobile high-definition link (MHL) interface, a secure digital (SD) card/multi-media card (MMC) interface, or an infrared data association (IrDA) standard interface.

The audio module 280 may convert, for example, sound into an electrical signal, and vice versa. At least some elements of the audio module 280 may be included, for example, in the input/output interface 150 illustrated in FIG. 1. The audio module 280 may process sound information that is input or output through, for example, a speaker 282, a receiver 284, earphones 286, the microphone 288, and the like.

The camera module 291 is, for example, a device which may photograph a still image and a video. According to an embodiment of the present disclosure, the camera module 291 may include one or more image sensors (for example, a front sensor or a back sensor), a lens, an Image Signal Processor (ISP) or a flash (for example, LED or xenon lamp). That is, the camera module 291 may include a plurality of image sensors having different characteristics. The different characteristics are factors for determining characteristics of photographed images and may be characteristics for types of images (black and white or color), resolution, and view angle.

For example, the camera module 291 may be configured by a combination of image sensors that support different resolutions. That is, the combination of the image sensors included in the camera module 291 may include an image sensor having a high resolution (high definition) and an image sensor having a low resolution (low definition), include an image sensor for acquiring a black and white image and an image sensor for acquiring a color image, or include an image sensor having a wide view angle and an image sensor having a narrow view angle. Also, the combination of image sensors may be configured in consideration of a plurality of characteristics. That is, the combination may include a black and white (BW) image sensor for acquiring a black and white image having a relatively high resolution and a color image sensor for acquiring a color image having a relatively low resolution.

The camera module 291 may set different conditions of photography for each of a plurality of image sensors. For example, the conditions for photography may include an exposure value, a shutter speed, an aperture value, white balance, and sensitivity. The plurality of images sensors may generate different resultant images according to the set photographing conditions.

The power management module 295 may manage, for example, the power of the electronic device 201. According to an embodiment, the power management module 295 may include a Power Management Integrated Circuit (PMIC), a charger Integrated Circuit (IC), or a battery 296 or fuel gauge. The PMIC may use a wired and/or wireless charging method. Examples of the wireless charging method may include a magnetic resonance method, a magnetic induction method, an electromagnetic wave method, and the like. Additional circuits (for example, a coil loop, a resonance circuit, a rectifier, and the like) for wireless charging may be further included. The battery gauge may measure, for example, the residual amount of the battery 296 and a voltage, current, or temperature while charging. The battery 296 may include, for example, a rechargeable battery and/or a solar battery.

The indicator 297 may display a particular state, for example, a booting state, a message state, a charging state, or the like of the electronic device 201 or a part (for example, the processor 210) of the electronic device 201. The motor 298 may convert an electrical signal into a mechanical vibration and may generate a vibration, a haptic effect, and the like. Although not illustrated, the electronic device 201 may include a processing unit (for example, a GPU) for supporting mobile TV. The processing unit for supporting the mobile TV may process media data according to a standard, such as Digital Multimedia Broadcasting (DMB), Digital Video Broadcasting (DVB), MediaFlo™, and the like. Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
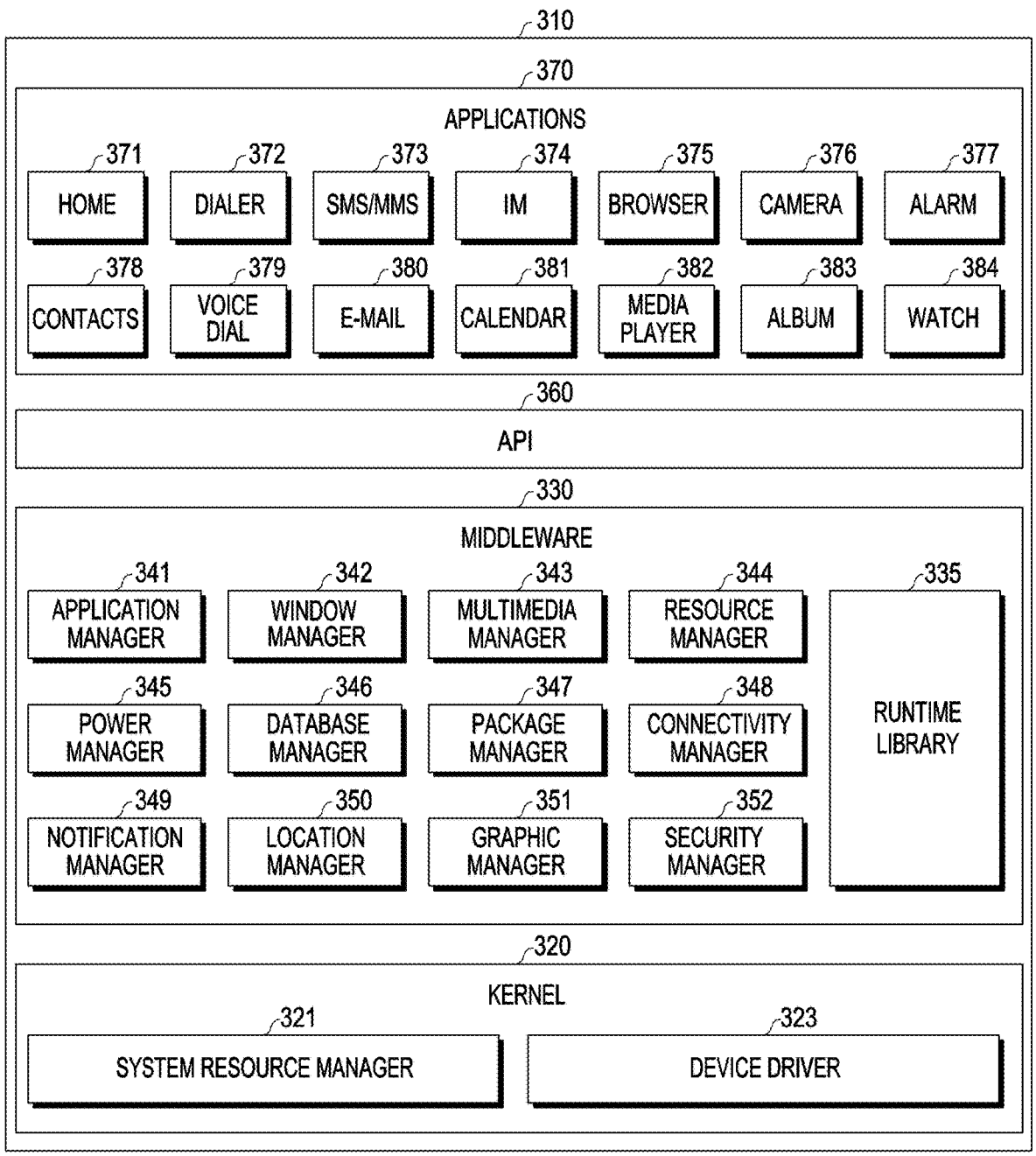
FIG. 3 is a block diagram illustrating a program module according to various proposed embodiments.

FIG. 3 is a block diagram of a program module according to various embodiments.

Referring to FIG. 3, the program module 310 (for example, the program 180) may include an Operating System (OS) for controlling resources related to the electronic device and/or various applications (for example, the applications 187) executed in the operating system. The operating system may be, for example, Android, iOS, Windows, Symbian, Tizen, Bada, and the like The program module 310 may include a kernel 320, middleware 330, an Application Programming Interface (API) 360, and/or applications 370. At least some of the program module 310 may be preloaded on the electronic apparatus, or may be downloaded from an external electronic apparatus (for example, the electronic apparatus 102 or 104, or the server 106).

The kernel 320, the middleware 330, the API 360, and the application 370 included in the program module 310 may be, for example, the kernel 181, the middleware 183, the API 185, and the application 187 included in the program 180 of FIG. 1.

The kernel 320 may include, for example, a system resource manager 321 and/or a device driver 323. The system resource manager 321 may control, allocate, or retrieve system resources. According to an embodiment, the system resource manager 321 may include a process management unit, a memory management unit, or a file system management unit. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide, for example, a function required by the applications 370 in common, or may provide various functions to the applications 370 through the API 360 such that the applications 370 can efficiently use limited system resources within the electronic device. According to an embodiment, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add new functions through a programming language while the applications 370 are executed. The runtime library 335 may perform input/output management, memory management, the functionality for an arithmetic function, and the like.

The application manager 341 may manage, for example, a lift cycle of at least one application of the applications 370.

The window manager 342 may manage Graphical User Interface (GUI) resources used on a screen. The multimedia manager 343 may identify formats required for reproducing various media files and may encode or decode a media file using a codec suitable for the corresponding format. The resource manager 344 may manage resources, such as a source code, a memory, a storage space, and the like of at least one of the applications 370.

The power manager 345 may operate together with, for example, a Basic Input/Output System (BIOS) to manage a battery or power, and may provide power information required for operating the electronic device. The database manager 346 may generate, search for, and/or change a database to be used by at least one of the applications 370. The package manager 347 may manage the installation or update of an application distributed in the form of a package file.

The connectivity manager 348 may manage a wireless connection, such as Wi-Fi, Bluetooth, and the like. The notification manager 349 may display or notify of an event, such as an arrival message, an appointment, a proximity notification, and the like, in such a manner as not to disturb a user. The location manager 350 may manage the location information of the electronic device. The graphic manager 351 may manage a graphic effect to be provided to a user and a user interface relating to the graphic effect. The security manager 352 may provide various security functions required for system security, user authentication, and the like. According to one embodiment, in cases where the electronic device has a telephone call function, the middleware 330 may further include a telephony manager for managing a voice or video call function of the electronic device.

The middleware 330 may include a middleware module that forms a combination of various functions of the above-described elements. The middleware 330 may provide a module specialized for each type of OS in order to provide a differentiated function. Furthermore, the middleware 330 may dynamically remove some of the existing elements, or may add new elements.

The API 360 is, for example, a set of API programming functions, and may be provided with different configurations depending on the operating system. For example, with respect to each platform, one API set may be provided in the case of Android or iOS, and two or more API sets may be provided in the case of Tizen.

The applications 370 may include, for example, one or more applications that can perform functions, such as a home application 371, dialer application 372, an SMS/MMS application 373, an Instant Message (IM) application 374, a browser application 375, a camera application 376, an alarm application 377, a contact application 378, a voice dial application 379, an e-mail application 380, a calendar application 381, a media player application 382, an album application 383, and a clock application 384. The applications 370 may include an application for performing a function, such as a health care application (for example, measuring an exercise quantity or blood sugar) or an environment information providing application (for example, providing atmospheric pressure, humidity, or temperature information).

According to an embodiment, the applications 370 may include an application (hereinafter, referred to as an "information exchange application" for convenience of description) for supporting an information exchange between the electronic device (for example, the electronic device 101) and an external electronic device. The application associated with the exchange of information may include, for example, a notification relay application for transferring specific information to an external electronic device or a device management application for managing an external electronic device.

For example, the notification relay application may include a function of transferring, to an external electronic device, notification information generated from the other applications of the electronic device (e.g., the SMS/MMS application, the e-mail application, the health management application, and the environmental information application). Furthermore, the notification relay application may, for example, receive notification information from the external electronic device and may provide the received notification information to a user.

The device management application, for example, may manage (for example, install, delete, or update) at least one function of an external electronic device communicating with the electronic device (for example, a function of turning on/off the external electronic device itself (or some components thereof) or a function of controlling the luminance (or a resolution) of the display), applications operating in the external electronic device, or services provided by the external electronic device (for example, a telephone call service and a message service).

According to an embodiment, the applications 370 may include a predetermined application (for example, a health care application of a mobile medical device) according to attributes of the external electronic device. According to an embodiment, the applications 370 may include applications received from an external electronic device. According to an embodiment, the application 370 may include a preloaded application or a third party application which can be downloaded from the server. The names of the elements of the program module 310, according to the embodiment illustrated in the drawing, may vary according to the type of operating system.

According to various embodiments, at least a part of the program module 310 may be implemented in software, firmware, hardware, or a combination of two or more thereof. At least some of the program module 310 may be implemented (for example, executed) by, for example, the processor (for example, the processor 210). At least some of the program module 310 may include, for example, a module, a program, a routine, a set of instructions, and/or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added. Various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

Figure 4:
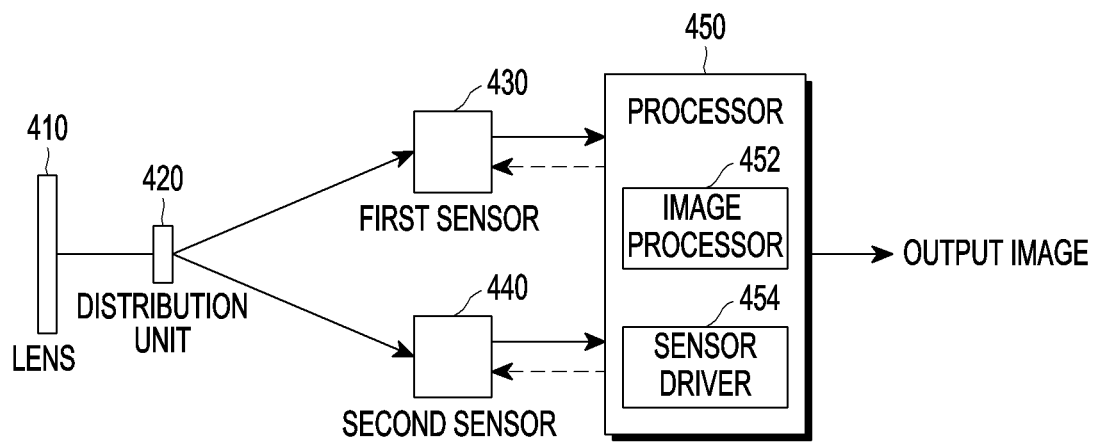
FIG. 4 illustrates an example of the configuration of an image processing device according to various proposed embodiments.

FIG. 4 illustrates an example of the configuration of an image processing device according to various proposed embodiments.

Referring to FIG. 4, the image processing device may include one lens 410, a distribution unit 420, first and second sensors 430 and 440, and a processor 450. The processor 450 may include an image processor 452 and a sensor driver 454. Although the image processor 452 and the sensor driver 454 are illustrated as elements included in the processor 450 in the drawing, they may be independent elements separated from the processor 450. Although the two sensors are illustrated as an example in the drawing, two or more sensors may be implemented. Further, one lens may be further included, and a plurality of sensors corresponding to the added lens may be disposed.

The lens 410 is a transparent piece of glass that refracts light reflected from a subject and may be attached in a cylindrical shape to the front part of a camera body such as a television camera, a film camera, or a photographic camera regardless of the type thereof. In spite of different shapes and sizes, the lens 410 generally performs, as the camera's eyes, the same function of reconstructing an image of the subject.

The lens 410 may be classified into various types according to functions thereof. For example, the lens may be classified into a wide-angle lens, a standard lens, a telephoto lens, and a zoom lens. Further, the lens 410 may be classified according to characteristics such as a luminance or a speed. For example, the luminance or the speed of the lens may be characteristics of the lens 410 related to a minimum aperture value (f). The luminance of the lens 410 means the minimum aperture value (f) (maximum aperture opening).

As the maximum aperture opening value of the lens 410 is larger (as the minimum aperture value f is smaller), much more light can be penetrated per time (lens is brighter). As the lens 410 is brighter, a faster shutter speed can be secured, so that a brighter image can be acquired even in a dark photographing environment (environment in which a light receiving amount is small).

The distribution unit 420 may distribute light refracted through the lens 410 to a predetermined number of paths. For example, as the light refracted through the lens 410 is reflected from a medium such as a mirror to the two paths, the same light may be transferred to a desired place.

The first sensor 430 and the second sensor 440 may detect light supplied through the distribution unit 420 and generate an electric image signal (image frame) based on the detected light. A device constituting the first sensor 430 and the second sensor 440 may include a metal-oxide semiconductor (MOS), a charge coupled device (CCD), or a complementary metal-oxide semiconductor (CMOS). Further, the first sensor 430 and the second sensor 440 may be divided into a black and white image sensor and a color image sensor according to the type of an image expressed by an electric image signal. In general, the representative reason why the sensor cannot increase a data frame is that a light receiving light of the sensor is limited. In addition, limit on a number of analog-to-digital conversion devices and a bandwidth of a Mobile Industry Processor Interface (MIPI) may be the issue which can be solved when the image sensor is manufactured in the future.

The first sensor 430 and the second sensor 440 may have different characteristics by the device constituting them. The characteristics are factors for determining characteristics of photographed images and may be characteristics for types of images (black and white or color), resolution, and viewing angle.

For example, the first sensor 430 and the second sensor 440 may support different resolutions. That is, the first sensor 430 may support a high resolution (high definition) and the second sensor 440 may support a low resolution (low definition). Further, the first sensor 430 may generate a black and white image based on the detected light and the second sensor 440 may generate a color image based on the detected light. The first sensor 430 and the second sensor 440 may generate images at different view angles. In addition, the first sensor 430 and/or the second sensor 440 may have a plurality of different characteristics. That is, the first sensor 430 may be a black and white (BW) image sensor for acquiring a black and white image having a relatively high resolution and the second sensor 440 may be a color image sensor for acquiring a color image having a relatively low resolution.

For example, under the assumption of the same photographing environment (when it is assumed that the same light receiving amount is supplied), the black and white image sensor may provide a relatively high frame rate (frame per second: fps) compared to the color image sensor. That is, in the same photographing environment, the black and white image sensor may acquire more image frames during the same time compared to the black and white image sensor. However, the black and white image acquired by the black and white image sensor may have a relatively smaller amount of data compared to the color image acquired by the color image sensor.

For the first sensor 430 and the second sensor 440, independent photographing conditions may be configured. For example, for the first sensor 430 and the second sensor 440, different exposure values, different shutter speeds (exposure time), different sensor sensitivities (ISO characteristic values), and different aperture values may be configured. In this case, characteristics of the image acquired from the first sensor 430 and the image acquired from the second sensor 440 may be different.

Using this, a plurality of color images having the low resolution and a black and white image having the high resolution may be acquired during the same time by the first sensor 430 and the second sensor 440 for which different photographing conditions are configured. That is, a plurality of color images by a plurality of photographing conditions may be photographed during a read time of one black and white image.

For example, when photographing is performed in an extremely low illumination environment, the photographing may be attempted only using the black and white image sensor (for example, the first image sensor 430) while the color image sensor (for example, the second image sensor 440) is turned off. In this case, one black and white image may be generated by composing a plurality of black and white images output by the black and white image sensor (for example, the first image sensor 430).

The processor 450 may provide a method of resolving the problem of not acquiring a high frame rate due to a light receiving amount and a method of solving a large amount of calculations for processing the problem.

The processor 450 may set an independent photographing condition for each of the first sensor 430 and the second sensor 440 and perform image matching including color composition and image composition using image frames provided from the first sensor 430 and the second sensor 440.

The sensor driver 454 included in the processor 450 may control driving of each of the first sensor 430 and the second sensor 440. That is, the sensor driver 454 may turn on or off both the first sensor 430 and the second sensor 440, or turn on only one of the first sensor 430 and the second sensor 440. In order to set the independent photographing condition for each of the first sensor 430 and the second sensor 440, the sensor driver 454 may set separately set an exposure value, a shutter speed, a sensor sensitivity (ISO characteristic value), and an aperture value for each of the first sensor 430 and the second sensor 440.

For example, the sensor driver 454 may set different camera setting values (photographing conditions such as exposure) for the first sensor 430 and the second sensor 450 in a low illumination environment. Based on the different camera setting values, the image processor 452 may acquire images having different characteristics and acquire a bright and clear image even in the low illumination environment by composing the acquired images having different characteristics. In this case, the image processor 452 may use a wide Dynamic Range (DR) of the black and white image and DR and a color reproduction characteristic of the color image for image composition.

The sensor driver 454 may turn off the second sensor 440, which is the color image sensor, and turn on the first sensor 430, which is the black and white image sensor, in an extremely low illumination environment. In this case, the image processor 452 may generate a new image by composing black and white images photographed by the first sensor 430. The first sensor 430 may photograph the black and white images by different settings. To this end, the sensor driver 454 may set a plurality of photographing conditions for each sensor.

The image processor 454 included in the processor 450 may perform an FRC calculation using first image frames provided from the first sensor 430 and second image frames provided from the second sensor 440. For example, the FRC calculation may include a scheme by a duplicating frame and a scheme by motion compensation.

For example, the image processor 452 may acquire black and white image frames (source black and white image frames) having a relatively high data rate from the first sensor 430 and acquire color image frames having a relatively low data rate from the second sensor 440. The image processor 452 may configure duplicating black and white image frames (or expanding black and white image frames) from the black and white image frames. The image processor 452 may perform image matching based on source black and white image frames, expanding black and white image frames, and color image frames. The image matching may include color composition and image composition.

For example, in the color composition, color diffusing may be performed on the source black and white image frames and the expanding black and white image frames through color information acquired from the color image frames. The color diffusing may be performed by spread of color information acquired from the source black and white frames and the expanding black and white image frames.

For example, the image composition may be performed by applying luminance information acquired from the source black and white image frames and the expanding black and white image frames to the color image frames.

By the color composition or the image composition, color image frames having a converted data rate, that is, color image frames having an improved resolution may be acquired as an output image.

The FRC for acquiring the duplicating image frames (or expanding image frames) using black and white image frames (source black and white image frames) may include a scheme by a duplicating frame and a scheme by motion compensation. For example, the FRC may be performed on the basis of an Edged Block Scaling (EBS) image format. The EBS image format is an image format defined for image compression and transmission based on information corresponding to each of edged, block, and scaling extracted from the image. Here, information (additional information) corresponding to the block (B) may be information related to a motion vector which can be acquired from the color image frame.

For example, it is possible to extract a more accurate motion vector by searching for global motion in the color image, extracting an edge of the black and white image, and performing the FRC on the extracted edge.

In this case, the image processor 450 should solve the problem of an amount of calculations due to the FRC. For example, the image processor 450 may perform down scaling on the color image frame, acquire a motion vector from the down-scaled color image frame of the low resolution, and search for global motion using the acquired motion vector. Further, the image processor 450 may simply and easily search for real motion on the basis of the global motion vector from the black and white image frames. The real motion refers to a real motion vector. When real motion is found as described above, it is possible to prevent a wrong motion from being acquired due to a calculation error (local minima).

The motion vector defines a value corresponding to a direction and a size that define motion in video frames according to the lapse of time. The motion vector may be divided into a global motion vector and a local motion vector. The global motion vector defines a motion vector generated between two images when an image sensor is shaken or moved or when the image sensor pans or tilts. The local motion vector defines a motion vector generated between two images when an object within an image or a partial area (for example, an image block) moves.

According to the above description, by searching for the global motion from the color image frame having the low resolution, it is possible to not only reduce an amount of calculations but also perform local dense matching on a part in which the global motion exists. This is also the reason why the amount of calculations can be reduced. The local dense matching may be used to reduce an amount of compressed data by defining an area in which there is no change in motion between successive image frames.

According to an embodiment, the first sensor 430 may be the black and white image sensor and the second sensor 440 may be the color image sensor. The black and white image sensor has a characteristic of providing a light receiving amount approximately three times more compared to the color image sensor. For example, based on the high resolution (HD), the black and white image sensor may process 480 fps but the color image sensor may process 240 fps. In general, the black and white image sensor may process up to 720 fps, and control fps according to an AP codec performance, the number of ADCs, and an MIPI bandwidth.

In this case, the first sensor 430 may output black and white image frames at a relatively high frame rate compared to the second sensor 450. Further, the second sensor 440 may output color image frames at a relatively low frame rate compared to the first sensor 430.

For example, the black and white image sensor corresponding to the first sensor 430 may output a first black and white image for the subject at a first time and output a second black and white image for the subject at a second time. The first sensor 430 may output more black and white images in addition to the first and second black and white images. The first sensor 430 may output more black and white images at first time intervals.

The color image sensor corresponding to the second sensor 440 may output the color image for the subject. The color image corresponding to the second sensor 440 may output the color image at a third time existing between the first time and the second time. The second sensor 440 may output more color images at second time intervals.

Resolutions of the first black and white image and the second black and white image may be relatively higher than the resolution of the color image. Alternatively, the resolution of the color image may be relatively higher than the resolutions of the first black and white image and the second black and white image.

The processor 450 may acquire the first black and white image, the second black and white image, and the color image. The processor 450 may generate a third black and white image corresponding to the third time existing between the first time and the second time based on at least some information of the first black and white image and at least some information of the second black and white image. At least some information of the first black and white image may be acquired by first edge information corresponding to the first black and white image, and at least some information of the second black and white image may be acquired by second edge information corresponding to the second black and white image.

The processor 450 may acquire another color image through the second sensor 440 and acquire a motion vector corresponding to the corresponding subject based on the previously acquired color image and additionally acquired another color image. In this case, the processor 450 may generate the third black and white image between the first time and the second time based on at least some of the motion vector.

The processor 450 may acquire color information from the acquired color image or some of the color information. The processor 450 may determine a first color and a second color based at least partially on the color information acquired from the color image. The processor 450 may generate a first composite color image by composing the first black and white image and the determined first color. The processor 450 may generate a second composite color image by composing the second black and white image and the determined second color. The processor 450 may store the generated first and second composite color images in the memory as video data. The processor 450 may sequentially display the first and second composite color images on the screen.

When the third black and white image is generated, the processor 450 may generate a third color image by composing the determined third color and the third black and white image based on the color information or another color information related to the first color image or the second color image. Further, the processor 450 may generate the third color image at the third time existing between the first time and the second time based on at least some information of the first color image and at least some information of the second color image.

Figure 5:
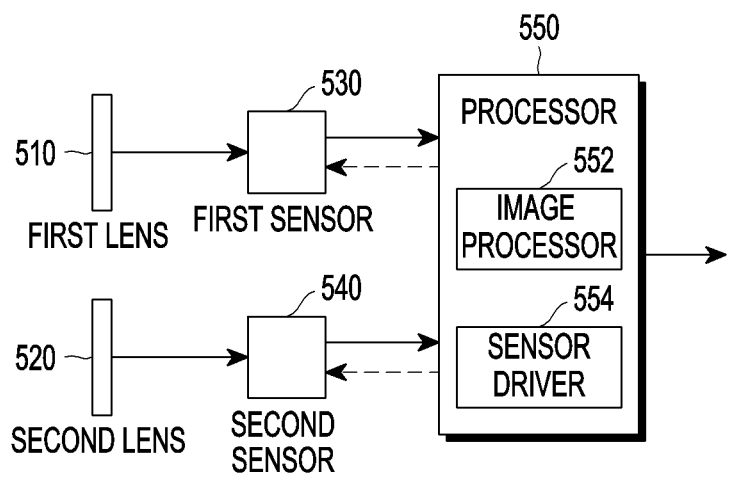
FIG. 5 illustrates another example of the configuration of an image processing device according to various proposed embodiments.

FIG. 5 illustrates another example of the configuration of an image processing device according to various proposed embodiments.

The image processing device illustrated in FIG. 5 has the structure in which a lens independent for each sensor is provided instead of the distribution unit 420 included in the image processing device illustrated in FIG. 4.

According to an embodiment, a first lens 510 and a second lens 520 may be independently configured in accordance with each of the first sensor 530 and the second sensor 540. The first lens 510 and the second sensor 520 may have different shapes and sizes and may be classified into various types according to functions thereof. For example, the lens may be classified into a wide-angle lens, a standard lens, a telephoto lens, and a zoom lens. The first and second lenses 510 and 520 may be classified according to characteristics such as a luminance or a speed. For example, the luminance or the speed of the lens may be a characteristics of the lens related to a minimum aperture value (f). The luminance of the first and second lenses 510 and 520 refers to the minimum aperture value (f) (maximum aperture opening).

As the maximum aperture opening value of the first and second lenses 510 and 520 is larger (as the minimum aperture value f is smaller), a larger amount of light may be penetrated per unit time (lens is brighter). As the first and second lenses 510 and 520 are brighter, a faster shutter speed can be secured, so that a brighter image can be acquired even in a dark photographing environment (environment in which a light receiving amount is small).

According to various proposed embodiments, the first lens 510 and the second lens 520 may or may not have the same characteristic. For example, the first lens 510 may be a wide-angle lens, and the second lens 520 may be a telephoto lens. The first lens 510 and the second lens 520 may have different degrees of refraction of lights reflected from the subject according to the type thereof and different amounts of light.

Functions of other elements, that is, first and second sensors 530 and 540 and a processor 550 including an image processor 552 and a sensor driver 554 and operations according thereto may be the same as those of the corresponding elements in FIG. 4.

Meanwhile, although not illustrated in the drawings, the number of lens and the number of sensors in FIGS. 1 and 2 are not limited to proposed various embodiments. That is, various proposed embodiments are not restrictively applied only to a particular number of lenses or a particular number of sensors. Further, a structure generated by combining the structure proposed in FIG. 1 and the structure proposed in FIG. 2 can be implemented. That is, the image processing device may be configured in the structure in which light is supplied to a plurality of sensors using one of the three or more lenses and the distribution unit and the remaining two or more lenses supply light to corresponding sensors.

Figure 6:
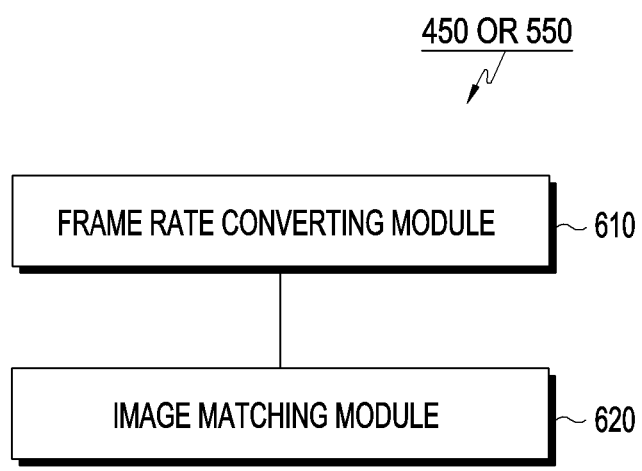
FIG. 6 is a block diagram illustrating image processing according to various proposed embodiments.

FIG. 6 is a block diagram illustrating image processing according to various proposed embodiments.

Referring to FIG. 6, the image processor 450 or 550 may include a frame rate converting module 610 and an image matching module 620.

The frame rate converting module 610 may acquire duplicating image frames (or expanding image frames) using black and white image frames (source black and white image frames) having a relatively high data rate.

After performing image matching using color image frames having a relatively low data rate, the image matching module 620 may perform image matching on the source black and white image frames and the expanding image frames. The image matching may include color composition in which color diffusing is performed by adding a color to source black and white image frames and expanding image frames based on color information acquired from the color image frame. Further, the image matching may include image composition in which the resolution of the color image frame is increased by using luminance information acquired from the source black and white image frames and the expanding image frames.

The image processor 450 and 550 may acquire, as an output image, color image frames of which the data rate is converted by the image matching.

According to an embodiment, the frame rate converting module 610 may perform RFC of acquiring duplicating image frames (or expanding image frames) using black and white image frames (source black and white image frames). The frame rate converting module 610 may perform ERC through a scheme by a duplicating frame and a scheme by motion compensation.

For example, the frame rate converting module 610 may perform the FRC on the based on an EBS. In the EBS, it is possible to extract a more accurate motion vector by searching for global motion in the color image, extracting an edge of the black and white image, and performing the FRC on the extracted edge.

The image matching module 620 may perform down-scaling on the color image frame, acquire a motion vector from the down-scaled color image frame of the low resolution, and search for global motion through the acquired motion vector. Further, the image matching module 620 may search for simple real motion on the basis of the global motion from the black and white image frames.

According to the above description, by searching for the global motion from the color image frame having the low resolution, it is possible to not only reduce an amount of calculations but also perform local dense matching on a part in which the global motion exists. This may be also the reason why the amount of calculations can be reduced.

Figure 7:
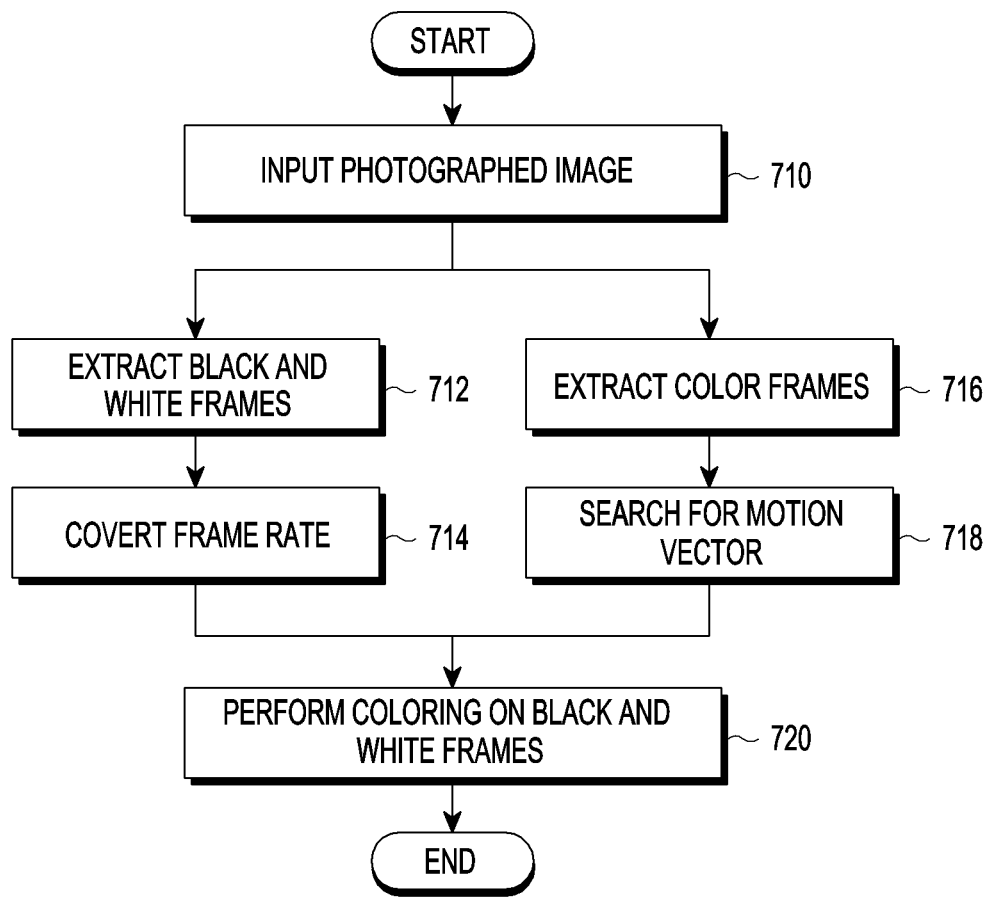
FIG. 7 illustrates a control flow of an image processing procedure according to various proposed embodiments.

FIG. 7 illustrates a control flow of an image processing procedure according to various proposed embodiments.

Referring to FIG. 7, an image processing device (for example, the first sensor 430 or 530, or the second sensor 440 or 540) may receive a photographed image in step 710. The photographed image may mean that light refracted by one or a plurality of lens is detected by a plurality of sensors. The detected light may be output as an electric image signal (image frames) by each of the plurality of sensors.

The image processing device may extract black and white image frames through one of the plurality of sensors in step 712. The image processing device may convert a frame rate using the extracted black and white image frames in step 714.

According to an embodiment, duplicating image frames (or expanding image frames) may be acquired using black and white image frames (source black and white image frames) having a relatively high data rate. That is, FRC of acquiring duplicating image frames (or expanding image frames) using black and white image frames (source black and white image frames) may be performed. The FRC may be performed by a scheme by a duplicating frame and a scheme by motion compensation.

For example, the FRC may be performed on the basis of EBS. In the EBS, it is possible to extract a more accurate motion vector by searching for global motion in the color image, extracting an edge of the black and white image, and performing the FRC on the extracted edge.

The image processing device may extract color image frames through one of the plurality of sensors in step 716. The image processing device may search for a motion vector through the extracted color image frames in step 718.

For example, after performing image matching using color image frames having a relatively data rate, the image processing device may perform color diffusing on the source black and white image frames and the expanding image frames.

According to an embodiment, it is possible to perform down-scaling on the color image frame and acquire a motion vector from the down-scaled color image frame of the low resolution. Further, a global motion vector can be found using the acquired motion vector. At this time, simple real motion may be found on the basis of the global motion vector from the black and white image frames.

The image processing device may perform coloring on the black and white image frames of which the frame rate is converted on the basis of the found motion vector in step 720. Accordingly, the image processing device may acquire the color image frames of which the data rate is converted as an output image.

Figure 8:
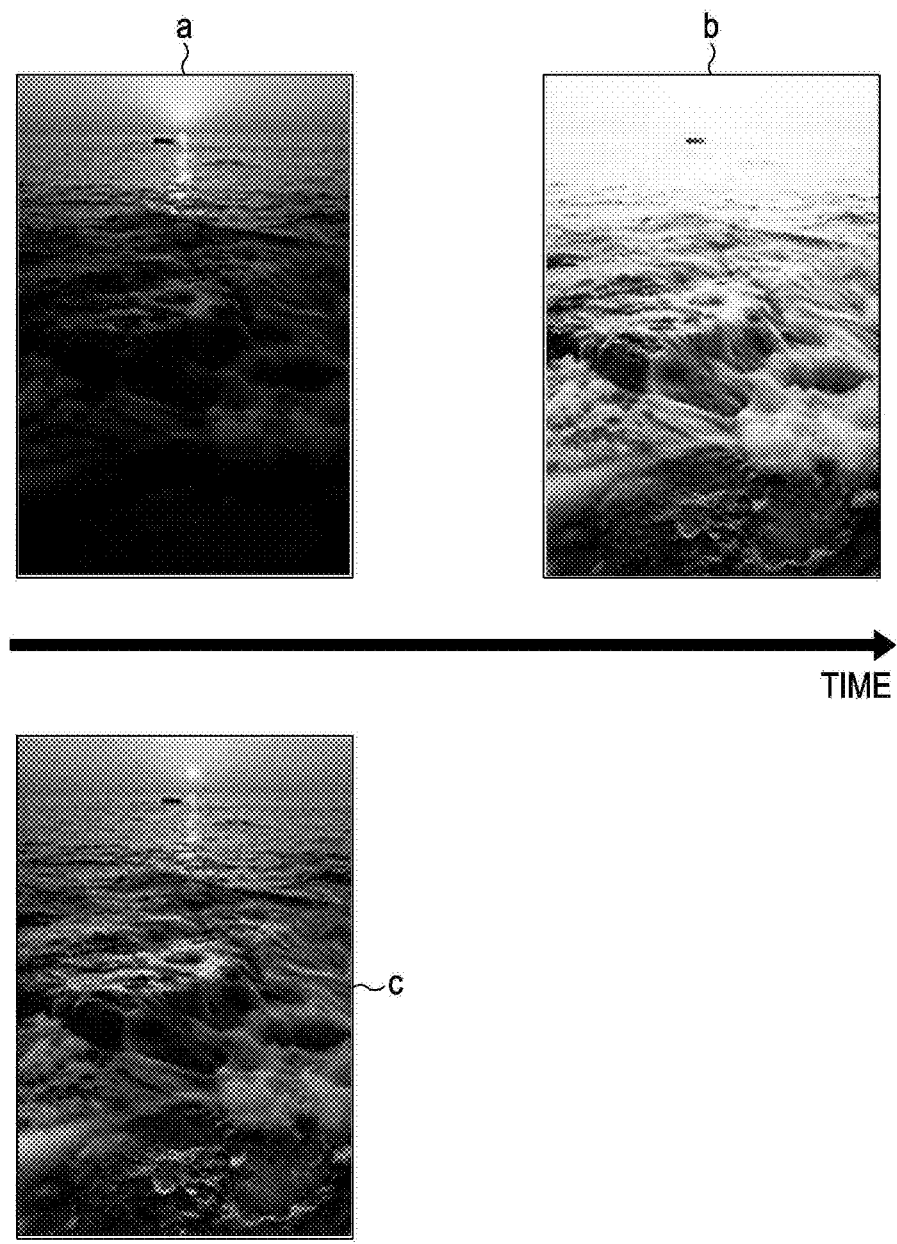
FIG. 8 illustrates an example of photographing using two image sensors in the electronic device according to various proposed embodiments.

FIG. 8 illustrates an example of photographing using two image sensors in the electronic device according to various proposed embodiments.

Referring to FIG. 8, two color images (a and b) on the upper side are photographed by a color image sensor under different exposure conditions and one image (c) on the lower side is photographed by a black and white image sensor. As described above, the two color images (a and b) can be photographed in accordance with the one black and white image (c) at the same time zone due to a resolution difference between the black and white image and the color image. That is, the black and white image may have a relatively high resolution compared to the color image. In this case, a read time of the black and white image of the high resolution may be relatively longer than a read time of the color image of the low resolution. Accordingly, the two color images (a and b) can be photographed during the read time of the one black and white image (c).

In the two color images, it may be noted that an exposure time for photographing of the second color image b may be set to be longer than that of the first color image a.

Figure 9:
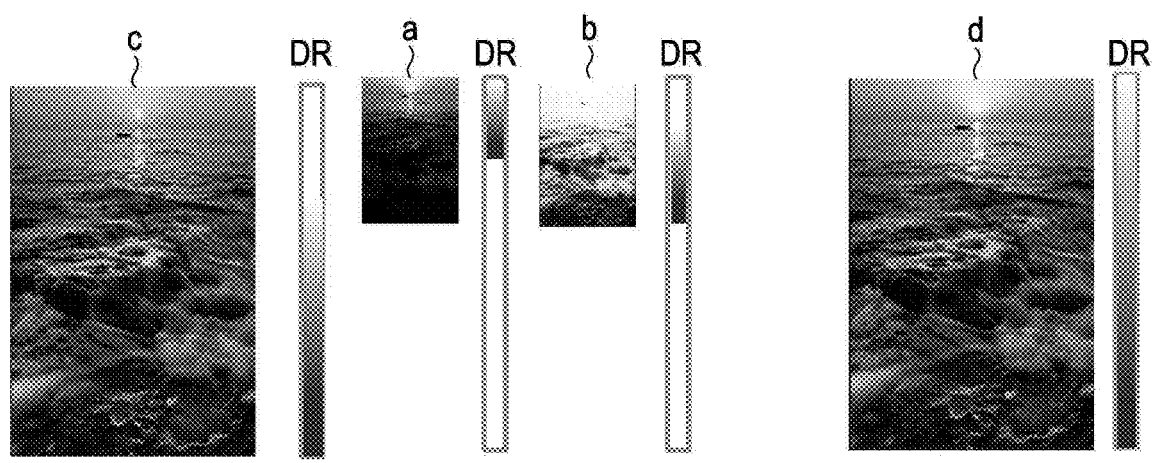
FIG. 9 illustrates an image composition example in the electronic device according to various proposed embodiments.

FIG. 9 illustrates an image composition example in the electronic device according to various proposed embodiments.

Referring to FIG. 9, one composite image d may be generated by composing one black and white image c and two color images a and b. It may be noted that a dynamic range (DR) of the one black and white image c is wider than DRs of the two color images a and b. Further, it may be noted that the DR of the color image b among the two color images a and b may be wider than the DR of the color image a.

For example, the one composite image d may be generated by acquiring luminance information from the one black and white image c, acquiring color difference information from the two color images a and b, and using the acquired luminance information and color difference information.

Figure 10:
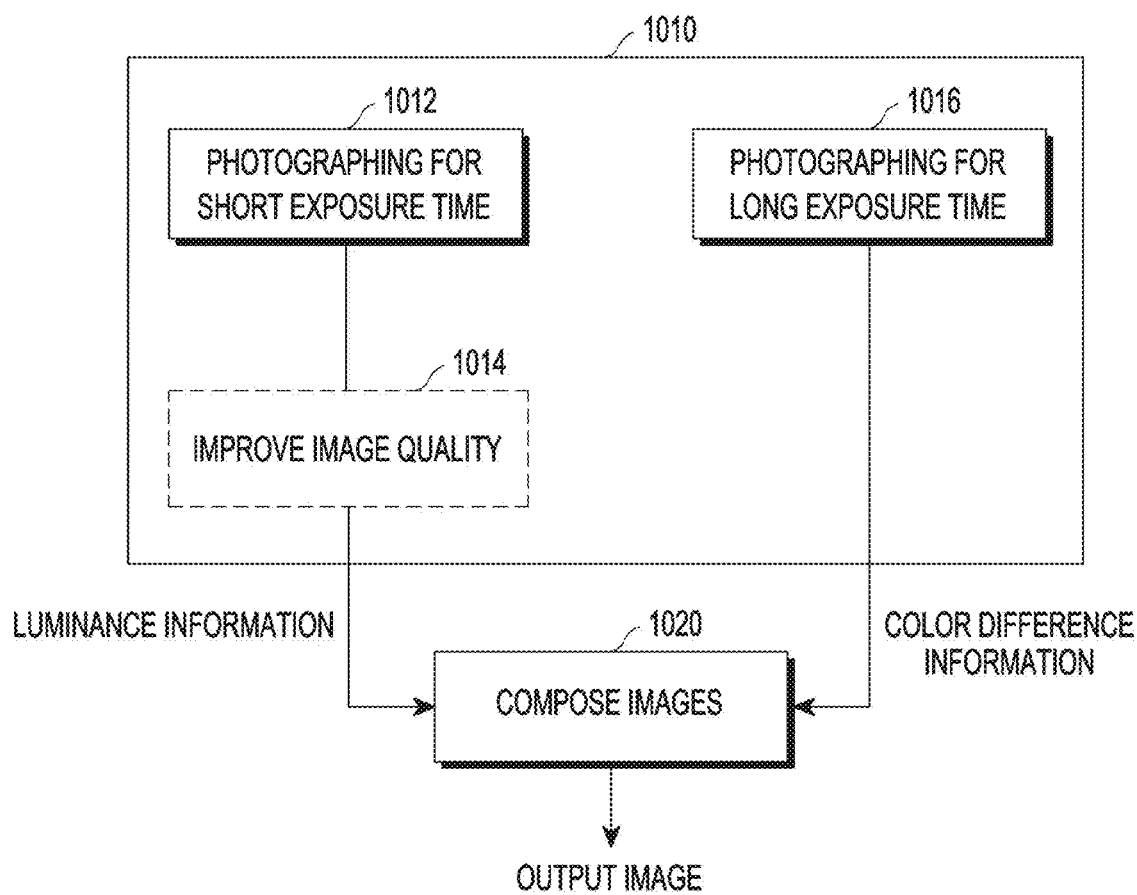
FIG. 10 illustrates an image composition procedure in the electronic device according to various proposed embodiments.

FIG. 10 illustrates an image composition procedure in the electronic device according to various proposed embodiments.

Referring to FIG. 10, an image composition procedure in a low illumination environment may be performed through an information extraction step 1010 and an image composition step 1020.

In the information extraction step 1010, an operation of extracting luminance information from a black and white image photographed for a short exposure time indicated by reference numeral 1012 and extracting color difference information from a plurality of color images photographed for a long exposure time indicated by reference numeral 1016. To this end, settings (exposure and shutter speed) for a short exposure time may be performed for the image sensor to photograph a black and white image, and settings (exposure and shutter speed) for a long exposure time may be performed for the image sensor to photograph a plurality of color images. Further, photographing of the black and white image and photographing of the plurality of color images should be performed for almost the same time.

When illumination is very low, several images may be photographed and a procedure of improving luminance through the photographed several images may be performed in step 1014. This is not limited only to the black and white image, but may be equally applied to photographing of the color image. When illumination is low, photographing settings for long exposure may be performed for the color image sensor. Further, a plurality of photographing conditions may be set for the color image sensor and the color image sensor may photograph a color image under each photographing condition. In this case, it is possible to acquire color images of improved quality through a plurality of color images acquired under different photographing conditions.

However, in the case of the color image sensor requiring long exposure, the operation thereof may be blocked in an extremely low illumination environment. In this case, a plurality of black and white images photographed under different conditions may be acquired through the black and white sensor alone and black and white images of improved quality may be generated based on the plurality of black and white images.

Figure 11:
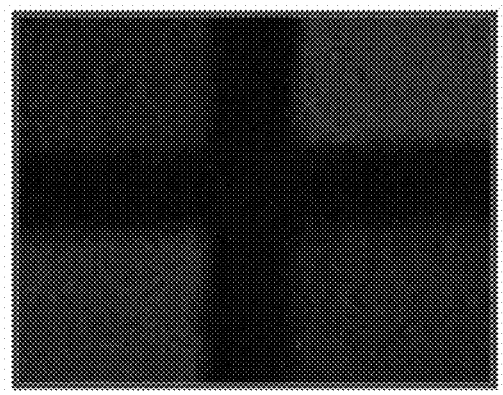
FIG. 11 illustrates an example of an image processing result according to various proposed embodiments.
Figure 11:
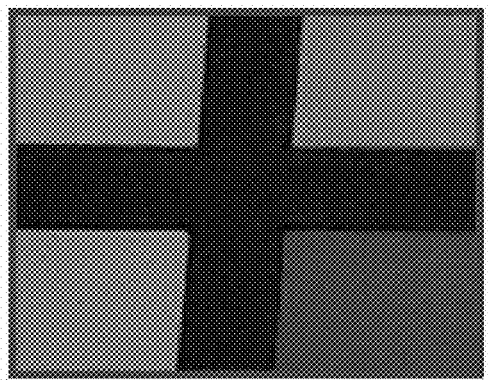
Figure 11:
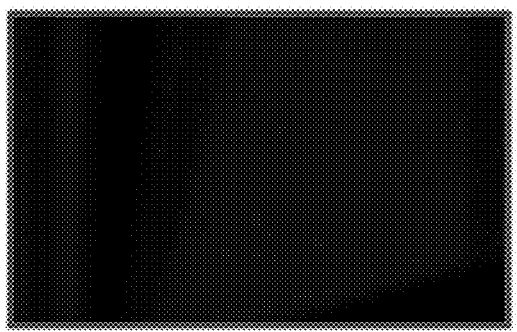
Figure 11:
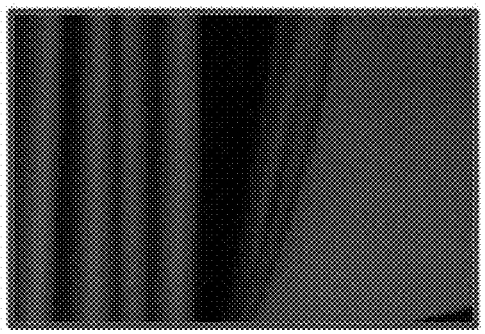

FIG. 11 illustrates an example of an image processing result according to various proposed embodiments.

Referring to FIG. 11, two left images are examples of a color image and a black and white image acquired by a color image sensor and a black and white image sensor in a low illumination environment, and two right images are examples of resultant images acquired after image processing according various proposed embodiments. It may be noted that the resultant image after image processing may be brighter and clearer compared to the image before image processing.

Figure 12:
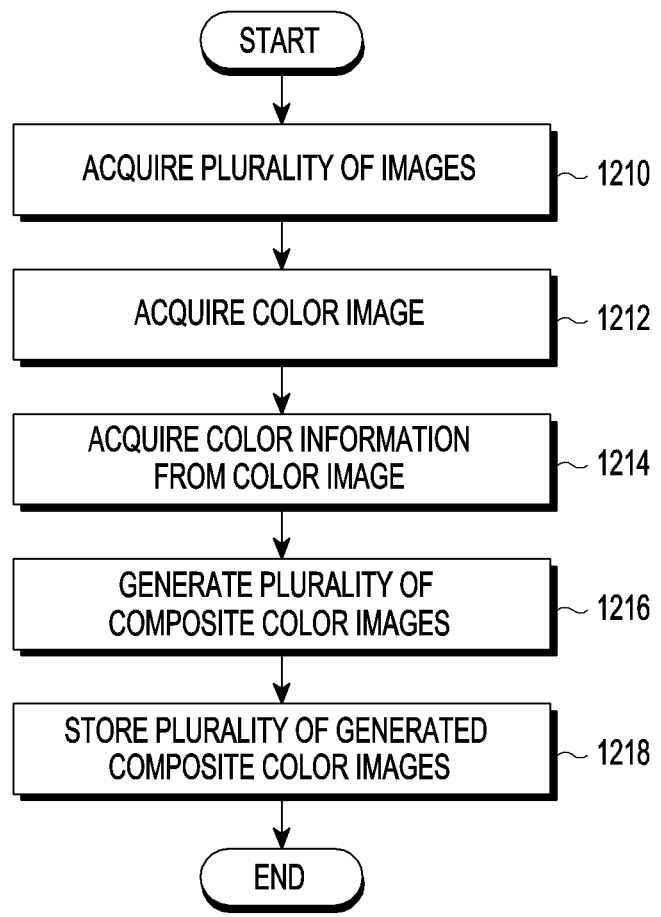
FIG. 12 illustrates a control flow of image processing in the electronic device according to various proposed embodiments.

FIG. 12 illustrates a control flow of image processing in the electronic device according to various proposed embodiments.

Referring to FIG. 12, the electronic device (for example, the processor 120) acquires a plurality of black and white images through the first image sensor in step 1210. For example, the electronic device may acquire a first black and white image for the subject at a first time and acquire a second black and white image for the subject at a second time. Through the first image sensor, the electronic device may output more black and white images in addition to the first and second black and white images. That is, the electronic device may acquire more black and white images at first time intervals through the first image sensor.

The electronic device may generate a third black and white image at a predetermined time existing between the first time and the second time based on at least some information of the first black and white image and at least some information of the second black and white image. The electronic device may acquire at least some information of the first black and white image by first edge information corresponding to the first black and white image. The electronic device may acquire at least some information of the second black and white image by second edge information corresponding to the second black and white image.

The electronic device acquires a color image for the subject through the second image sensor in step 1212. The electronic device may acquire the color image at the predetermined time between the first time and the second time at which the first and second black and white images are acquired. The electronic device may acquire more color images at second time intervals.

The electronic device may acquire another color image through the second image sensor. In this case, the electronic device may acquire a motion vector corresponding to the corresponding subject based on the previously acquired color image and additionally acquired another color image. The electronic device may generate a third black and white image between the first time and the second time based on at least some of the motion vector.

The first image sensor (black and white image sensor) has a characteristic of providing a light receiving amount approximately three times more compared to the second image sensor (color image sensor). For example, based on the high resolution (HD), the black and white image sensor may process 480 fps but the color image sensor may process 240 fps. In general, the black and white image sensor may process up to 720 fps, and control fps according to an AP codec performance, the number of ADCs, and an MIPI bandwidth.

In this case, the first image sensor may output black and white image frames at a relatively high frame rate compared to the second image sensor. Further, the second image sensor may output color image frames of a relatively low frame rate compared to the first image sensor.

The electronic device may acquire the first black and white image, the second black and white image, and the color image. Resolutions of the first black and white image and the second black and white image may be relatively higher than the resolution of the color image. Alternatively, the resolution of the color image may be relatively higher than the resolutions of the first black and white image and the second black and white image.

The electronic device may acquire color image or some of the color image from the acquired color image in step 1214. The electronic device may generate a plurality of composite color images through image matching using the acquired color information or some of the color information in step 1216.

For example, the electronic device may determine a first color and a second color based on at least some of the acquired color information. The electronic device may generate a first composite color image by composing the first black and white image and the determined first color. The electronic device may generate a second composite color image by composing the second black and white image and the determined second color.

The electronic device may store the generated first and second composite color images in the memory as video data in step 1218. The electronic device may sequentially display the generated first and second composite color images on the screen.

When the third black and white image is generated, the electronic device may generate the third color image by composing the determined color and the third black and white image based on color information or another color information related to the first color image or the second color image. In addition, the electronic device may generate the third color image at the third time existing between the first time and the second time based on at least some information of the first color image and at least some information of the second color image.

Although specific embodiments have been described in the detailed description of the present disclosure, it will be apparent to a person skilled in the art that various modifications and changes may be made without departing from the scope of various embodiments proposed in the present disclosure. Therefore, the scope of the present disclosure should not be defined as being limited to the aforementioned embodiments, but should be defined by the appended claims and equivalents thereof. In addition, such variant embodiments should not be understood separately from the technical idea or scope of the present disclosure.

The invention claimed is:

1. An electronic device comprising:
a memory;
a first black and white (BW) image sensor;
a second image sensor; and
a processor,
wherein the processor is configured to:
obtain a first resolution of a black and white image for a subject during a specified time by using the first BW image sensor,
obtain a second resolution of a first color image based on a first exposure time for the subject and the second resolution of a second color image based on a second exposure time for the subject by using the second image sensor while obtaining the first resolution of the black and white image, wherein the first resolution is higher than the second resolution,
obtain color information corresponding to the black and white image based on the first color image and the second color image, obtain a color image by composing the black and white image and the color information corresponding to the black and white image, and store the color image in the memory as video data.

2. The electronic device of claim 1, wherein the processor is further configured to:

obtain a plurality of black and white images including a first black and white image at a first time and a second black and white image at a second time by using the first BW image sensor, and obtain a third black and white image based on the plurality of black and white images.

3. The electronic device of claim 2, wherein the processor is further configured to obtain the third black and white image corresponding to a third time between the first time and the second time based on at least some information of the first black and white image and at least some information of the second black and white image.

4. The electronic device of claim 3, wherein the processor is further configured to:

obtain first edge information corresponding to the first black and white image as the at least some information of the first black and white image, and obtain second edge information corresponding to the second black and white image as the at least some of the second black and white image.

5. The electronic device of claim 3, wherein the processor is further configured to obtain another color image by composing the third black and white image and the color information corresponding to the third black and white image.

6. The electronic device of claim 2, wherein the processor is further configured to:

obtain a motion vector corresponding to the subject based on the first color image and the second color image, and obtain the third black and white image corresponding to a time between the first time and the second time based on at least some of the motion vector.

7. The electronic device of claim 2, wherein the processor is further configured to obtain a third color image corresponding to a third time between the first time and the second time based on at least some information of the first color image and at least some information of the second color image.

8. The electronic device of claim 1, wherein the processor is further configured to display the color image through a display functionally connected to the processor.

9. A method of operating an electronic device including a first black and white (BW) image sensor and a second image sensor, the method comprising:

obtaining a first resolution of a black and white image for a subject during a specified time by using the first BW image sensor;

obtaining a second resolution of a first color image based on a first exposure time for the subject and the second resolution of a second color image based on a second exposure time for the subject by using the second image sensor while obtaining the first resolution of the black and white image, wherein the first resolution is higher than the second resolution;

obtaining color information corresponding to the black and white image based on the first color image and the second color image;

obtaining a color image by composing the black and white image and the color information corresponding to the black and white image; and storing the color image and the second color image in a memory as video data.

10. The method of claim 9, further comprising:

obtaining a plurality of black and white images including a first black and white image at a first time and a second black and white image at a second time by using the first BW image sensor; and obtaining a third black and white image based on the plurality of black and white images.

11. The method of claim 10, wherein the third black and white image corresponding to a third time between the first time and the second time is obtained based on at least some information of the first black and white image and at least some information of the second black and white image.

12. The method of claim 11, wherein the obtaining of the third black and white image comprises:

obtaining a motion vector corresponding to the subject based on the first color image and the second color image, and wherein the third black and white image is obtained further using at least some of the motion vector.

13. The method of claim 12, wherein the subject includes one or more objects, and wherein the obtaining of the third black and white image comprises determining an area corresponding to an object selected from among the one or more objects in the third black and white image based on the at least some of the motion vector.

14. The method of claim 10, further comprising obtaining a third color image corresponding to a third time between the first time and the second time based on at least some of the first color image and the second color image.

15. The method of claim 9, further comprising displaying the color image through a display functionally connected to the electronic device.

16. A non-transitory computer-readable recording medium having a program recorded therein to execute operations, the computer-readable recording medium being included in an electronic device comprising a first black and white (BW) image sensor and a second image sensor, the operations comprising:

obtaining a first resolution of a black and white image for a subject during a specified time by using the first BW image sensor;

obtaining a second resolution of a first color image based on a first exposure time for the subject and the second resolution of a second color image based on a second exposure time for the subject by using the second image sensor while obtaining the first resolution of the black and white image, wherein the first resolution is higher than the second resolution;

obtaining color information corresponding to the black and white image based on the first color image and the second color image;

obtaining a color image by composing the black and white image and the color information;

corresponding to the black and white image; and storing the color image and the second color image in a memory as video data.

* * * * *